2 Sheets. Sheet 1.

Mc C. Young, Jr.

Harvester Rake.

No. 3977. Reissued. May 17, 1870.

Witnesses:

Joe Reyton

Baltis DeLong

Inventor:

C. H. McCormick } assignees of
L. J. McCormick } Mc C. Young Jr.
by their Attorney Wm. D. Baldwin 2 Sheets. Sheet 2

Mc. C. Young Jr.
Harvester Rake.

No. 3977. Reissued. May 17. 1870.

Witnesses:
Geo. A. Ryston
Battis DeLong.

Inventor:
C. H. McCormick } Assignees of
To C. H. McCormick } Mc. C. Young Jr.
by their Attorney
Wm. H. Baldwin

UNITED STATES PATENT OFFICE.

CYRUS H. McCORMICK AND LEANDER J. McCORMICK, OF CHICAGO, ILLINOIS,
(ASSIGNEES OF McCLINTOCK YOUNG, JR.)

IMPROVEMENT IN HARVESTERS.

Specification forming part of Letters Patent No. 21,587, dated September 21, 1858; reissue No. 779, dated July 19, 1859; reissue No. 866, dated December 13, 1859; reissue No. 3,977, dated May 17, 1870.

*To all whom it may concern:*

Be it known that McCLINTOCK YOUNG, Jr., of the city and county of Frederick, in the State of Maryland, invented certain new and useful Improvements in Harvesters, of which the following is a description and specification:

The object of the invention is in a harvester driven and controlled by a person riding on the machine to obtain an automatic side delivery of the cut grain; and this object is attained by combining with a series of reel-arms or beaters rotating around a common axis and gathering the grain to the cutters, a rake-arm also rotating around said axis and having in addition thereto an irregular movement on an axis transverse to its axis of rotation, so that the rake descends into the standing grain in front of the cutters and parallel, or nearly so, to the finger-beam, presses the grain back against the cutters, sweeps over the platform in the arc of a circle and discharges the cut grain in gavels at the side of the machine, and then rises and moves forward to the front again without interfering with the driver in his seat upon the machine.

Figure 1:
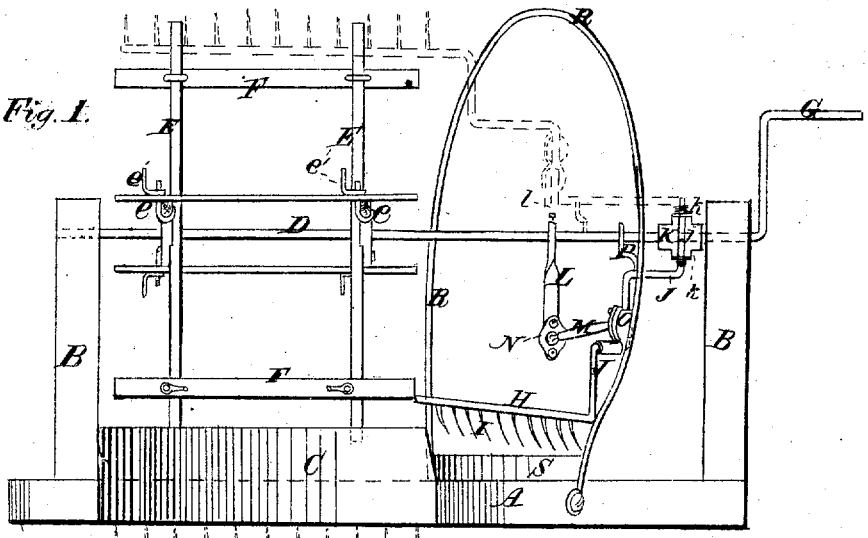
Figure 2:
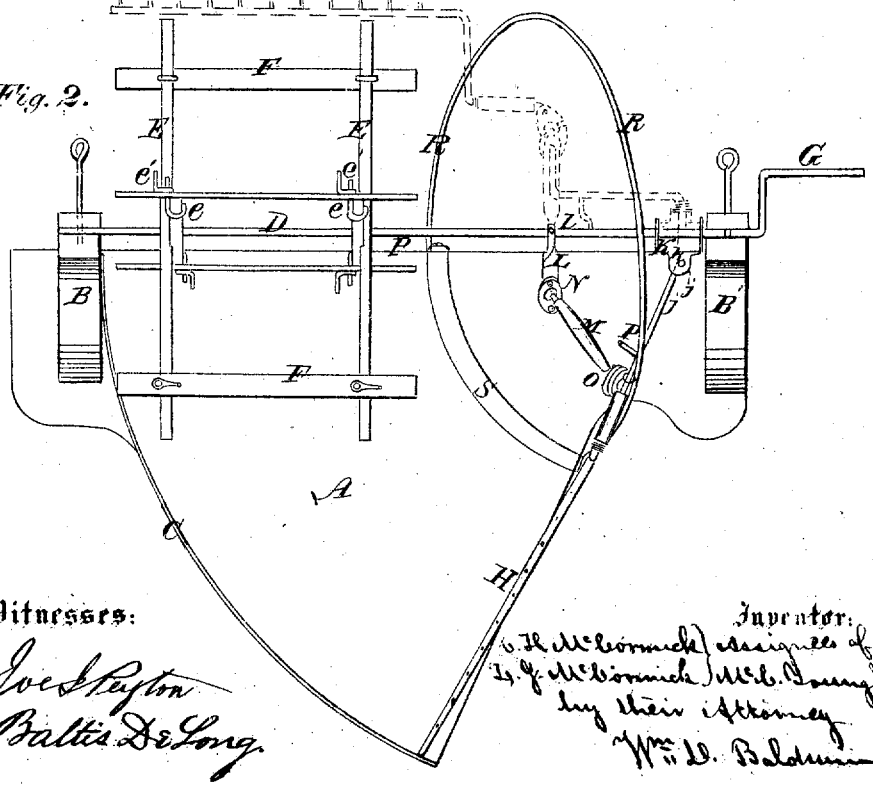
Figure 3:
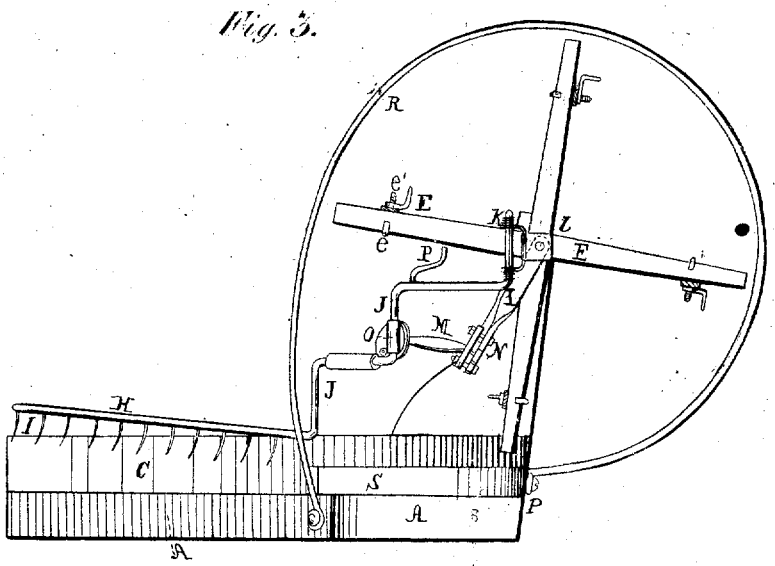

In the accompanying drawings, which make part of this specification, Figure 1 represents a rear elevation of so much of a self-rake harvester as is necessary to exemplify the application of the improvements herein claimed, the rake being shown in full lines in the position it occupies just after discharging the gavel, and in dotted lines in the position it occupies when beginning to descend into the standing grain in front of the cutters. Fig. 2 represents a plan, the position being the same as in Fig. 1, except that the dotted lines in this figure represent the rake-arm in a position more nearly horizontal than that shown by the dotted lines in Fig. 1. Fig. 3 represents an elevation, as seen from the gearing side, the reel-post on that side being removed.

The platform A has guard boards or fenders C S curved to conform substantially to the path of the rake in discharging the gavel, thus constituting what is well known as a quadrant or sector-shaped platform, having a cutting apparatus attached to its front edge *p*, in the usual manner. A shaft, D, mounted in proper bearings in supports B B′, is driven through suitable gearing from the driving-wheel, as indicated by the crank G. This shaft D is arranged slightly in advance of the front edge of the platform, which location permits the gatherers to reach well forward into the standing grain to gather it to the cutters. Reel-arms E are mounted on the shaft D, and gatherers F are secured upon the arms E by hooks or staples *e* which fit over the arms and pass through the gatherers, the gatherers being held in position by clamp-screws *e′*, or by wedges inserted between the staples and the arms. By this means the gatherers may be moved along upon the arms toward or from the reel-shaft, and the diameter of the reel varied. The rake is constructed and combined with the shaft D, so as to also reach well forward into the standing grain and gather it to the cutters, thus acting as a reel rib or gatherer during that portion of its revolution when it is in front of the platform; but after passing the cutters and the front edge of the platform it leaves the path of the reel and assumes the operation of a discharging-rake, conforming in its movements to the curve of the platform, sweeping the grain over the platform, and discharging it in rear of the machine out of the track of the horses in passing round the field to cut the next swath. A bracket, K, is mounted and turns freely on the shaft D. The rake-arm J turns freely in lugs *k* on the bracket K, and the rake-arm J is thus permitted to revolve with the bracket around the shaft D, and at the same time to oscillate on its pivot in the lugs, which pivot is transverse to the shaft D, and also eccentric to the shaft D. The rake-arm thus swivels on substantially a universal joint, and has a peculiar movement, hereinafter more fully described.

An arm, L, projects from the shaft D, along and upon which it can be moved to adjust it to any desired position relatively to the rake-arm J, and when adjusted it is locked fast on the shaft by the set-screw *l*. A pitman, M, by means of a ball-and-socket joint, N O, at each end connects this arm with the rake-arm J, so that these parts work freely in the proper relation to each other. A guide, R, encircles the reel-shaft and rake-arm, as shown in the drawings, and controls the movement of the rake during a portion of its circuit, as hereinafter explained.

The operation is as follows: As the machine advances the shaft D is rotated by the gearing, as hereinbefore mentioned. The operation may be supposed to commence just after the discharge of a gavel, when the rake occupies the position shown by the full lines in the drawings. The rotation of the shaft D causes the arm L and pitman M to lift the rake, which rises and moves forward, being guided by the guide R in a path outside of, and eccentric to, that of the reel. As the rake passes in front of the reel-shaft it drops inward, the joint O on the rake-arm moving in the arc of a circle round the joint N of the arm L, and the rake also oscillating on pivot *j* in the lugs *k*, while the bracket K turns around the shaft D more rapidly than the reel rotates. The effect of these movements is to throw the rake quickly forward and inward between two of the reel-gatherers and parallel therewith.

A stop, P, on the rake-arm abuts against the reel-shaft, and prevents the rake from falling too far within the path of the reel. The rake then moves forward at the same speed as the reel, being prevented by the arm L and pitman M from falling forward faster than the shaft D turns. The rake then descends into the standing grain in front of the platform, being controlled by the guide R, and gradually diverges from the path of the reel. As the rake passes back of the front edge of the platform, the arm J assumes a vertical position, and the weight of the rake, together with the downward thrust of the arm L, keeps the bracket K from revolving round the reel-shaft, and thus temporarily stops the rotation of the rake, while the continued rotation of this shaft D causes the arm L and pitman M to push the rake around in a horizontal circular path, of which the pivot *j* of the rake-arm forms the center, thus sweeping the cut grain from the platform. This movement continues until the gavel is discharged, when the operation above described is repeated.

It will be observed that the rake always works between the same two reel-gatherers, notwithstanding the fact that the reel runs at a uniform speed, while the speed of the rake varies, the rake moving more slowly than the reel when raking off, but more rapidly when moving forward again, still, however, completing its revolution in the same time as the reel.

These movements result from the fact that the pivot of the rake is both eccentric and transverse to the shaft D, and, from its variable relation to the joint N, on the outer end of the arm L, for the arm L always revolves in a uniform relation to the shaft D, while the rake-pivot constantly varies its position relative to said arm. For instance, in the drawings the full lines show the pivot *j* and joint N on the same side of the shaft D, and consequently at their shortest distance from each other; the rake is therefore turned on its pivots and pushed out at an angle to the reel-shaft and arm L by the pitman M. When, however, the rake passes in front of the reel-shaft, the parts assume the position shown by the dotted lines in Fig. 1, the joint N and the pivot *j* of the rake then being on opposite sides of the reel-shaft, and consequently at their greatest distance apart; the rake is, therefore, drawn by the pitman within the path of the reel, and parallel with the finger-beam.

In raking off, the rake-pivot *j* and joint N gradually approach each other, and thus cause the horizontal turning movement of the rake, hereinbefore described.

The guide R, it will be observed, prevents the rake from being deflected outward so far as to interfere with a person riding on the machine, and also guides it in the proper path when descending into the standing grain and upon the front of the platform.

We claim as the invention of said McClintock Young, Jr.—

1. The radial rake revolving around its shaft D, and oscillating on a pivot both eccentric and transverse to said shaft, substantially as hereinbefore set forth.

2. The combination of the radial rake revolving around its shaft D, and oscillating on a pivot both eccentric and transverse to said shaft, and the guide, which controls the rake both in descending upon the platform and in rising and moving forward to re-enter the standing grain, substantially as hereinbefore set forth.

3. The combination of the continuously-revolving reel-gatherers and the radial rake revolving around the same shaft as the gatherers, and vibrating on a pivot both eccentric and transverse to its axis of rotation, substantially as hereinbefore set forth.

4. The combination of the continuously-revolving reel-gatherers, the radial rake revolving around the same shaft as the gatherers, and oscillating on a pivot both transverse and eccentric thereto, and the guide, which controls the movement of the rake in descending upon the platform, substantially as hereinbefore set forth.

5. The combination of a rotating shaft, D, carrying a projecting arm, L, a radial rake pivoted eccentrically to said shaft, a swiveling pitman connecting the rake and the arm, and a guide to control the movement of the rake in entering the standing grain, substanstantially as hereinbefore set forth.

6. The combination, with a radial rake rotating around a shaft, D, and oscillating on a pivot both transverse and eccentric thereto, of a stop to limit the descent of the rake toward its axis of rotation, substantially as hereinbefore set forth.

7. The combination of rotating reel-gatherers, an arm, L, on the reel-shaft, a radial rake revolving around the same shaft as the gatherers, and connected with said shaft by a universal joint and a pitman, connecting the rake and the arm on the reel-shaft, substantially as described.

McCLINTOCK YOUNG, JR.
C. H. McCORMICK.
L. J. McCORMICK.

Witnesses as to signatures of McCLINTOCK YOUNG, Jr., and C. H. McCORMICK:
R. H. McCORMICK,
J. W. ADAMS.

Witnesses as to signature of L. J. McCORMICK:
C. A. SPRING, Jr.,
JOHN V. A. HASBROOK.